June 15, 1926.
R. E. WILSON
LIQUID DISPENSING PUMP
Filed Nov. 12, 1923
1,589,025
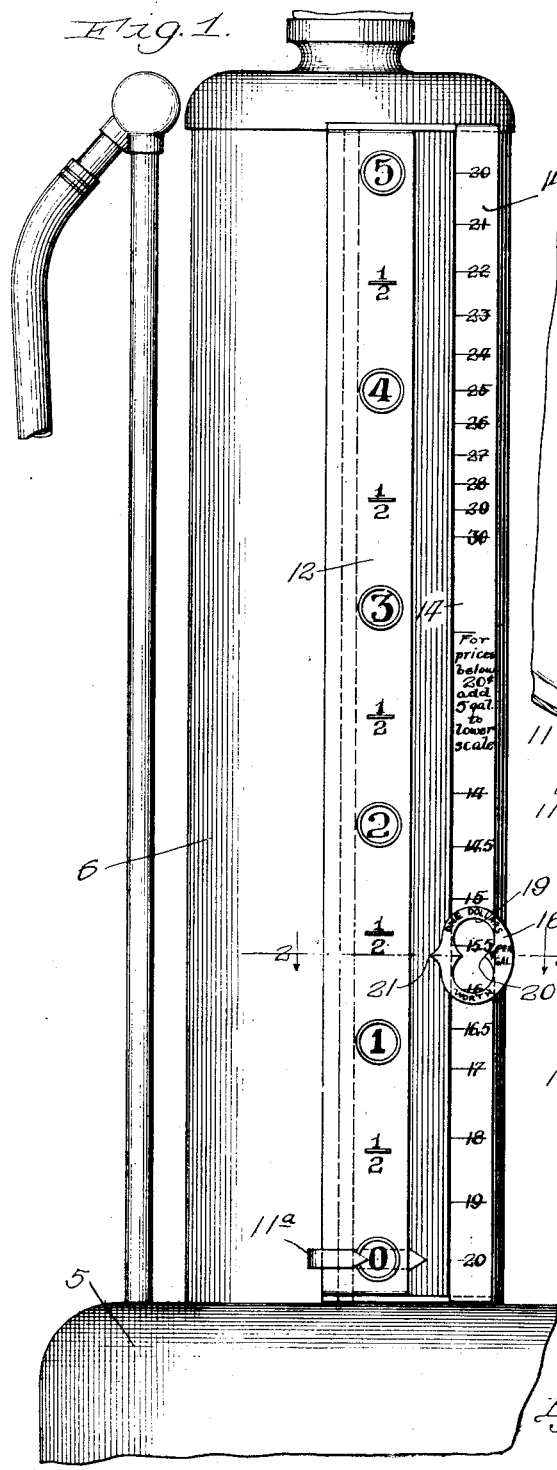
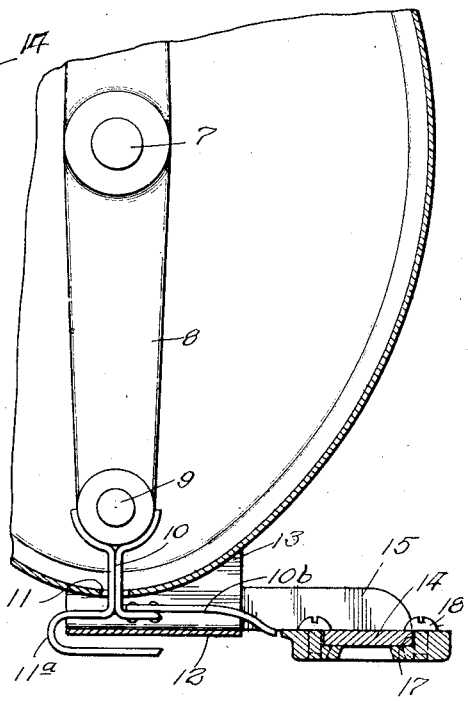
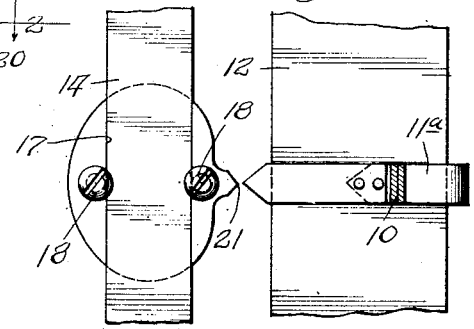
Inventor:
Robert E. Wilson,
By Byrnforth, Lee, Chritton & Wiles
Attys.

Patented June 15, 1926.

1,589,025

UNITED STATES PATENT OFFICE.

ROBERT E. WILSON, OF CHICAGO, ILLINOIS, ASSIGNOR TO STANDARD OIL COMPANY, OF WHITING, INDIANA, AND CHICAGO, ILLINOIS, A CORPORATION OF INDIANA.

LIQUID-DISPENSING PUMP.

Application filed November 12, 1923. Serial No. 674,335.

This invention relates to improvements in liquid dispensing pumps, and more particularly in the type of pump employed for the dispensing of gasoline in which an indicator device, connected to or operated by the reciprocating piston rod of the pump cooperates with a fixed scale indicating the volume or gallonage of liquid dispensed.

In accordance with the present invention, means are provided to cooperate with the piston operated indicator whereby the pump may be employed to indicate not only the gallonage dispensed, but may also be employed for dispensing a volume of gasoline having a fixed price; for example, most usually a dollar's worth of gasoline.

The invention will be clearly understood from the following description, illustrated by the accompanying drawings in which—

Figure 1 is a side elevation of the upper part of the pump construction of this type, embodying the present invention, Fig. 2 is a partial sectional view through the line 2—2 of Fig. 1, and Fig. 3 is a detailed view in rear elevation of a part of the device.

In the drawings the numeral 5 indicates the housing for the pump proper, on which is mounted a smaller housing 6 in which reciprocates the piston rod 7 having at its upper end a cross-bar 8 guided in its movement by the rod 9 and to which is secured an indicator member 10 which projects through a slot 11 formed in the housing 6. The indicator 10, on the outside of the housing is bent at 11ᵃ to form a U-shaped hook around a vertical bar 12 which is supported on the housing 6 by brackets 13. On the bar 12 are marked at the proper points the gallons of liquid which are dispensed when the pump is operated to raise the indicator 10 to the corresponding position relative to the scale marking.

To the indicator 10 there is secured, back of the scale bar 12, an outwardly projecting indicator member 10ᵇ, which projects a sufficient distance so that it is ordinarily visible to the operator during the operation of the pump. Parallel to the scale bar 12 a second scale bar 14 is supported on brackets 15, which are preferably secured to the brackets 13 on which the scale bar 12 is mounted. The scale bar 14 is provided with a series of markings which indicate the prices of unit volumes of the liquid being dispensed, for example, the price per gallon, and these markings are so positioned that, when, in the travel of the pump rod, the indicator 10 comes opposite one of the aforesaid markings, the pump has then dispensed a volume of the liquid having a certain fixed value, the price per unit volume being that indicated by the marking. To facilitate the operation of the device, a slidable indicating member 16 is mounted on the scale rod 14, being provided with grooves 17 into which the scale bar fits. Screws 18 are likewise provided on the back of the indicator member 16, these screws being located adjacent the grooves 17 so that, when screwed down, they secure the indicator member firmly in position on the scale bar. An opening 19 is provided on the face of the indicator member 16, and the contour of this opening is such as to provide pointers 20 alined with an externally projecting pointer 21, these pointers being placed upon the desired mark on the scale.

In the particular form illustrated, the invention is shown in connection with a pump capable of dispensing five gallons of gasoline. The scale bar 12 is provided with markings indicating gallons and half gallons from zero to five. The upper portion of the scale bar 14 is provided with markings indicating the volume to be dispensed for one dollar, at certain prices per gallon, and it will be noted that the 20 cent mark is opposite the 5 gallon mark of scale 12 and the 25 cent mark is opposite the 4 gallon mark of scale 12. As is readily apparent, the indicator 16 may be set on the scale 14 at the prevailing price per gallon of gasoline, which may be, for example, 21 cents per gallon. If a customer demands a dollar's worth of gasoline, the operator then pumps gasoline until the pointer 10ᵇ of the indicator 10 comes opposite the pointer 21 of the indicator 16, at which time, one dollar's worth of gasoline at 21 cents per gallon will have been dispensed. It is readily apparent, that the indicator 16 may be caused to act as a positive stop, a projecting point member being engaged by a suitable pump rod projection.

As is readily apparent, when the price of gasoline is less than 20 cents per gallon, more than five gallons of gasoline is to be dispensed. On the lower portions of the scale bar 14 there are provided markings indicating prices per gallon less than 20 cents, these markings being so positioned that the volume dispensed when the indicator 10 comes opposite one of these markings, added to five gallons, constitutes the volume of gasoline having the fixed price of one dollar.

Although the present invention has been described in the connection with the details of construction of a specific embodiment thereof, it is not intended that these details shall be regarded as limitations upon the scope thereof, except in so far as included in the accompanying claims.

I claim:

1. In a liquid dispensing pump having a reciprocating piston rod, an indicator movable with the piston rod and a volume scale cooperating with the indicator, a second scale substantially parallel to the volume scale, said second scale having on its face markings designated by the prices of unit volumes of the liquid, said markings being so positioned that, when the pump rod indicator is brought into alinement therewith, a volume of gasoline having a fixed value at the designated price per unit volume is dispensed.

2. A pump having a reciprocable piston rod, an indicator movable therewith, a volume scale cooperating with said indicator, a second scale parallel to and spaced from the volume scale, the indicator projecting therebetween, a slidable indicator member on the second scale, means for securing said indicator member in predetermined position on the second scale, said second scale having on its face markings designated by the prices of unit volumes of the liquid, said markings being so positioned that, when the pump rod indicator is brought into alinement with the indicator member on the second scale, the said indicator member being positioned at one of said markings, the volume of liquid dispensed has a predetermined fixed value at the designated price per unit volume.

3. In a liquid dispensing pump having a reciprocating piston rod, an indicator movable with the piston rod, a volume scale cooperating with the indicator, and a second scale substantially parallel to the volume scale, said second scale having on its face markings indicating various prices per unit volume, said markings being so positioned that, when the pump rod indicator is brought into alinement with any one of the same, a volume of liquid represented by a predetermined unit value at said marking is dispensed.

ROBERT E. WILSON.